United States Patent
Yeh

(10) Patent No.: US 11,056,964 B2
(45) Date of Patent: Jul. 6, 2021

(54) POWER SUPPLY DEVICE WITH MULTIPLE WIDE-VOLTAGE RANGE OUTPUTS AND CONTROL METHOD THEREOF

(71) Applicant: Acbel Polytech Inc., New Taipei (TW)

(72) Inventor: Chia-An Yeh, New Taipei (TW)

(73) Assignee: Acbel Polytech Inc., New Taipei (TW)

(*) Notice: Subject to any disclaimer, the term of this patent is extended or adjusted under 35 U.S.C. 154(b) by 0 days.

(21) Appl. No.: 16/818,406

(22) Filed: Mar. 13, 2020

(65) Prior Publication Data

US 2021/0159770 A1 May 27, 2021

(30) Foreign Application Priority Data

Nov. 25, 2019 (TW) .................................. 108142674

(51) Int. Cl.
*H02M 1/00* (2006.01)
*H02M 3/00* (2006.01)
*H02M 7/02* (2006.01)

(52) U.S. Cl.
CPC ............... *H02M 1/00* (2013.01); *H02M 3/00* (2013.01); *H02M 7/02* (2013.01); *H02M 2001/008* (2013.01)

(58) Field of Classification Search
CPC ... H02M 1/00; H02M 7/02; H02M 2001/0025
See application file for complete search history.

(56) References Cited

U.S. PATENT DOCUMENTS

| | | | |
|---|---|---|---|
| 6,721,191 B2* | 4/2004 | Duerbaum | H02M 3/33561 363/16 |
| 9,692,296 B1* | 6/2017 | Dash | H02M 3/158 |
| 2011/0080102 A1* | 4/2011 | Ge | H05B 45/3725 315/200 R |
| 2018/0092179 A1* | 3/2018 | Guo | H05B 45/375 |
| 2019/0207424 A1* | 7/2019 | Yao | H02J 50/12 |
| 2020/0076299 A1* | 3/2020 | Xue | H02M 1/08 |

FOREIGN PATENT DOCUMENTS

TW  I673590 B  10/2019

* cited by examiner

Primary Examiner — Adi Amrany
(74) Attorney, Agent, or Firm — Thomas J. Nikolai; DeWitt LLP

(57) ABSTRACT

A power supply device has a first output port, a second output port and a power delivery control module. The power delivery control module compares the first output voltage value and the second output voltage value to determine a reference voltage value, and determines the optimized voltage value according to the total output power value, the reference voltage value, and a rated output current of an AC/DC converting module. The power delivery control module controls the AC/DC converting module to convert the AC input voltage to an optimized voltage, so that when the first and second DC/DC converting modules receive the optimized voltage and convert it to the first and second output voltages respectively, the voltage drop is reduced, the conversion loss is reduced, and the conversion efficiency of the power supply device is improved.

10 Claims, 8 Drawing Sheets

POWER SUPPLY DEVICE WITH MULTIPLE WIDE-VOLT AGE RANGE OUTPUTS AND CONTROL METHOD THEREOF

CROSS-REFERENCE TO RELATED APPLICATIONS

This application is based upon and claims priority under 35 U.S.C. 119 from Taiwan Patent Application No. 108142674 filed on Nov. 25, 2019, which is hereby specifically incorporated herein by this reference thereto.

BACKGROUND OF THE INVENTION

1. Field of the Invention

The present invention relates to a power supply device and a control method, and particularly to a power supply device with multiple wide-voltage-range outputs and a control method thereof.

2. Description of the Related Art

A power supply device is commonly used in the digital age since people often carry electronic devices around and often need to recharge or need a power source, and power supply devices have already been downsized to be carried around conveniently. However, different electronic devices usually have different rated input voltages and currents. If a user brings more than one electronic device around, the user needs to have corresponding power supply devices for the electronic devices and therefore trouble and inconvenience are caused. Recently, power supply devices that have multiple USB Type-C ports with Power Delivery (PD) function are developed. Since such power supply devices can provide different output voltages simultaneously according to the specifications of the electronic devices and the USB Type-C port also has a growing popularity on portable devices, power supply devices with auto-PD manage function and multi-Type-C outputs are a main trend in the field.

A USB Type-C power supply device with multiple output ports includes an AC/DC converter, multiple DC/DC converter and a PD controller. Each output port is connected to an electronic device, and the PD controller detects the rated input voltage and rated input current required by each electronic device according to the PD protocol. The AC/DC converter converts an AC input voltage into a first voltage, each DC/DC converter receives the first voltage and converts the first voltage to the required rated input voltage for each electronic device and provides the rated input voltage and rated input current to each output port.

The first voltage converted by the AC/DC converter is determined according to the highest voltage that the power supply device is specified to provide. For example, according to the USB Type-C PD protocol, the highest voltage that should be provided is 21 Volts (V), therefore, the first voltage outputted by the AC\DC converter is set to 21V. Each DC/DC converter further converts the 21V voltage into the required input voltage by each electronic device. When the PD controller determines a first input voltage required by a first device connected to a first output port of the power supply device is 15V, the PD controller controls the DC/DC converter corresponding to the first output port to convert the first voltage into 15V. When the PD controller determines a second input voltage required by a second device connected to a second output port of the power supply device is 9V, the PD controller controls the DC/DC converter corresponding to the first output port to convert the first voltage into 9V. However, the larger the voltage difference between the first voltage and a rated input voltage of an electronic device is, the lower the converting efficiency is. Therefore, when the rated input voltage is far lower than the first voltage, for example the first voltage is 21V and the rated input voltage is 3V, the voltage drop of the DC/DC converter is increased, causing a low converting efficiency. In the case mentioned above, wherein the DC/DC converter is making a 21V to 3V conversion, the efficiency is expected to be around 88%. As a result, the multi-output power supply device will have a low efficiency when providing power to devices that require low input voltage. Therefore, the power supply device having multiple USB Type-C ports needs to be improved.

SUMMARY OF THE INVENTION

The present invention provides a power supply device with multiple wide-voltage-range outputs and a control method thereof. The power supply device has a first output port and a second output port, and includes an AC/DC converting module, a first DC/DC converting module, a second DC/DC converting module, and a power delivery (PD) control module. The control method is performed by the PD control module, including the following steps:

detecting a first output voltage value and a first output power value of the first output port, and detecting a second output voltage value and a second output power value of the second output port;

comparing the first output voltage value and the second output voltage value, and determining a reference voltage value according to the comparison result; determining a total output power value according to the first output power value and the second output power value;

determining an optimized voltage value according to the reference voltage value, the total output power value, and a rated output current value of the AC/DC converting module;

controlling the AC/DC converting module to convert an AC input voltage into an optimized voltage according to the optimized voltage value; and controlling the first DC/DC converting module to convert the optimized voltage into a first output voltage according to the first output voltage value, and controlling the second DC/DC converting module to convert the optimized voltage into a second output voltage according to the second output voltage value.

When the first output port and the second output port are respectively connected to a first electronic device and a second electronic device, the PD control module detects the output voltage and the output power required by the first and second electronic devices. The PD control module than compares the first output voltage value and the second output voltage, determines the referenced voltage value according to the comparison result, and calculates the total output power value of the first and second output power values. Finally, the PD control module determines the optimized voltage according to the referenced voltage value, the total output power value, and the rated output current of the AC/DC converting module. The AC/DC converting module converts the input power into the optimized voltage according to the optimized voltage value, while the first DC/DC converting module converts the optimized voltage into the first output voltage and the second DC/DC converting module converts the optimized voltage into the second output voltage.

The power supply device firstly detects the output voltages and the output powers of the first and second electronic devices, and secondly decides the optimized voltage value that the AC/DC converting module provides to the first and second DC/DC converting modules. Since the optimized voltage value is decided with consideration of the first and second output voltage values, a sum of a first difference between the optimized voltage value and the first output value and a second difference between the optimized voltage and the second output value is reduced, and the efficiency of the first and second DC/DC converting modules is therefore improved.

The present invention further provides a power supply device with multiple wide-voltage-range outputs, connecting to an AC power source for receiving an AC input voltage, a first electronic device for outputting a first output voltage, and a second electronic device for outputting a second output voltage. The power supply device includes an AC input port, a first output port, a second output port, a PD control module, an AC/DC converting module, a first DC/DC converting module, and a second DC/DC converting module. The AC input port is connected to the AC power source; the first output port is connected to the first electronic device; the second output port is connected to the second electronic device; the PD control module is connected to the first output port and the second output port. The AC/DC converting module is connected to the AC input port and the PD control module, and has a converted voltage output end connecting to the first DC/DC converting module and the second DC/DC converting module. The PD control module detects the first output voltage value and the first output power value of the first output port, and detects the second output voltage value and the second output power value of the second output port. The PD control module compares the first output voltage value and the second output voltage value, and determines a reference voltage value according to the comparison result. Furthermore, the PD control module determines a total output power value according to the first output power value and the second output power value, and determines an optimized voltage value according to the reference voltage value, the total output power value, and a rated output current value of the AC/DC converting module.

The AC/DC converting module converts the AC input voltage into an optimized voltage according to the control signal of the PD control module, and outputs the optimized voltage to the first DC/DC converting module and the second DC/DC converting module through the converted voltage output end. The first DC/DC converting module is connected between the converted voltage output end and the first output port. The first DC/DC converting module receives the optimized voltage and converts the optimized voltage into the first output voltage, and outputs the first output voltage to the first electronic device through the first output port. The second DC/DC converting module is connected between the converted voltage output end and the second output port. The second DC/DC converting module receives the optimized voltage and converts the optimized voltage into the second output voltage, and outputs the second output voltage to the second electronic device through the second output port.

The AC/DC converting module firstly converts the AC input voltage into the optimized voltage, and the first DC/DC converting module converts the optimized voltage into the first output voltage required by the first electronic device, and the second DC/DC converting module converts the optimized voltage into the second output voltage required by the second electronic device. The first and second output voltages are respectively provided to the first and second electronic devices through the first and second output ports. The AC/DC converting module generates the optimized voltage according to the optimized voltage value received from the PD control module. The PD control module communicates with the first electronic device and the second electronic device through the first output port and the second output port according to the power delivery protocol, and detects the output voltage value and output power value required by the first electronic device and the second electronic device. The PD control module determines a better reference voltage value according to the first output voltage value and the second output voltage value, and further considers the total output power value (the sum of the first output power value and the second output power value), and the rated output current of the AC/DC converting module to adjust the reference voltage value and determines the optimized voltage value.

To sum up, the PD control module determines the reference voltage value by comparing the first output voltage value and the second output voltage value, and then determines whether to adjust the reference voltage value to decide the optimized voltage value according to the total output power value. Therefore, when the first DC/DC converting module and the second DC/DC converting module receive the optimized voltage, the referenced voltage is more in line with the first output voltage and the second output voltage. The conversion loss of the first DC/DC converting module and the second DC/DC converting module is lower, which improves the overall efficiency of the power supply device.

DETAILED DESCRIPTION OF THE INVENTION

Figure 1:
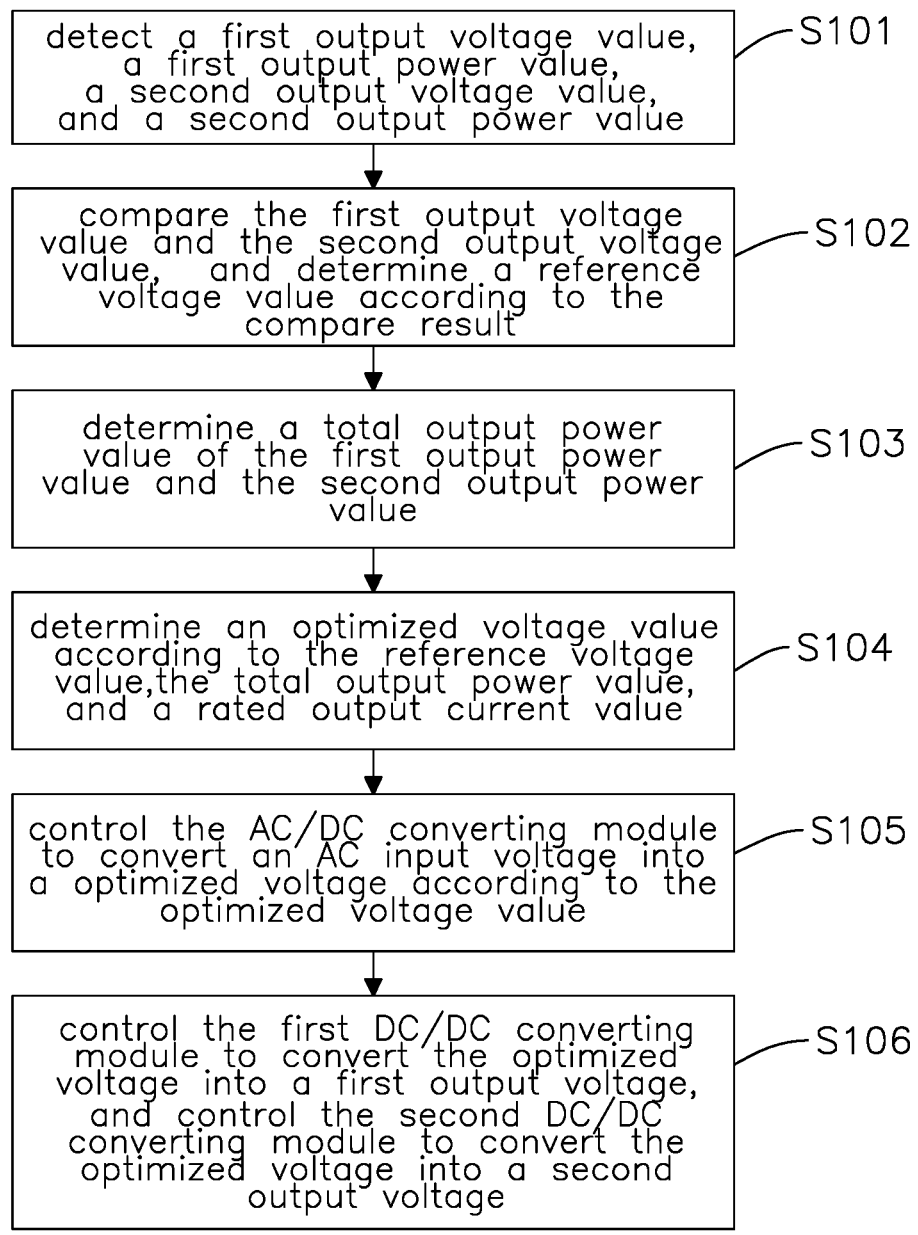
FIG. 1 is a flowchart of a control method of a power supply device with multiple wide-voltage-range outputs of the present invention.
Figure 2:
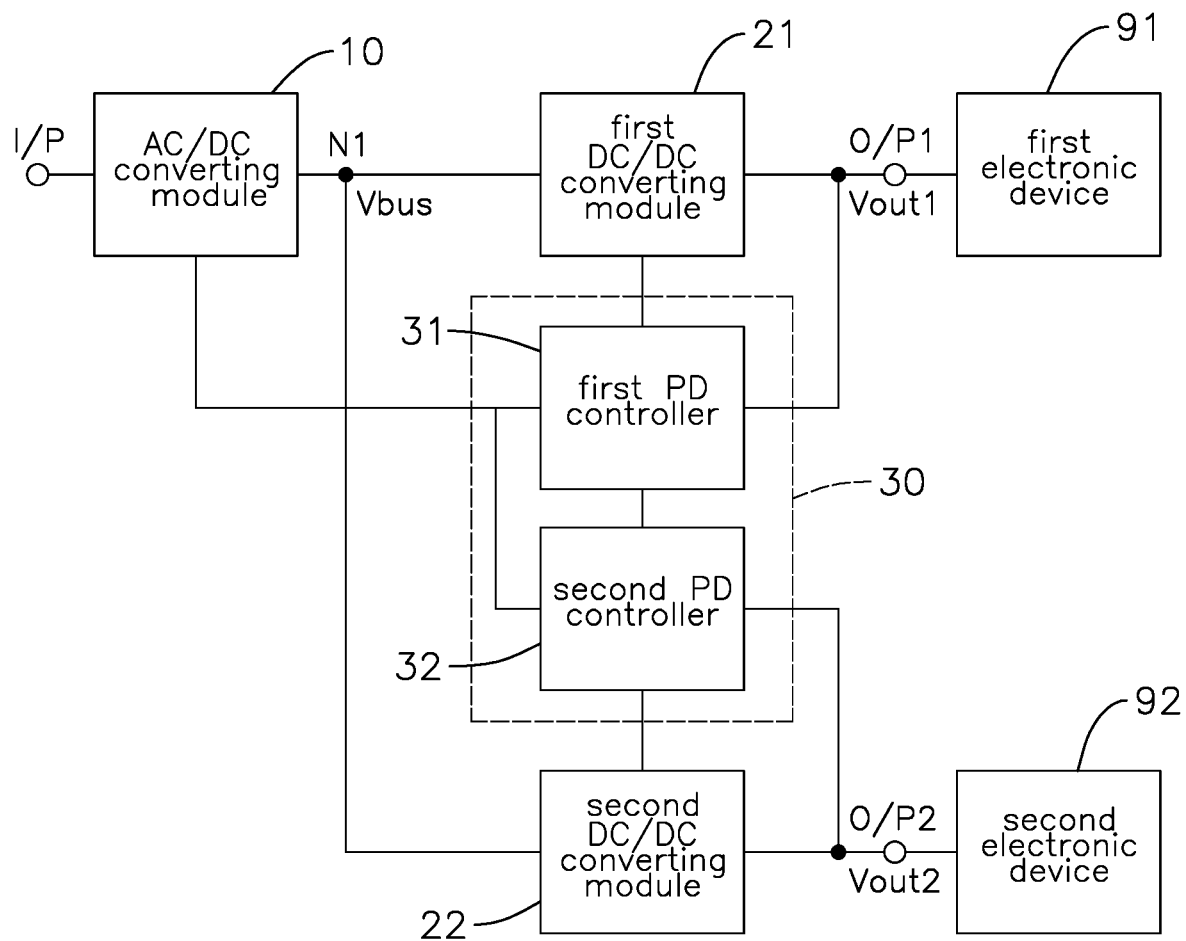
FIG. 2 is a block diagram of a power supply device with multiple wide-voltage-range outputs of the present invention.

With reference to FIG. 1 and FIG. 2, the present invention provides a power supply device control method with multiple sets of wide range voltage outputs, which is method executed by a power supply device with multiple sets of wide range voltage outputs. The power supply device has a first output port O/P1 and a second output port O/P2 for connecting a first electronic device 91 and a second electronic device 92 respectively. The power supply device includes an AC/DC converting module 10, a first DC/DC converting module 21, a second DC/DC converting module 22, and a power delivery (PD) control module 30. The control method is executed by the PD control module and includes the following steps:

S101: detecting a first output voltage value and a first output power value of the first output port, and detecting a second output voltage value and a second output power value of the second output port;

S102: comparing the first output voltage value and the second output voltage value, and determining a reference voltage value according to the comparison result;

S103: determining a total output power value according to the first output power value and the second output power value;

S104: determining an optimized voltage value according to the reference voltage value, the total output power value, and a rated output current value of the AC/DC converting module;

S105: controlling the AC/DC converting module to convert an AC input voltage into an optimized voltage according to the optimized voltage value;

S106: controlling the first DC/DC converting module to convert the optimized voltage into a first output voltage according to the first output voltage value, and controlling the second DC/DC converting module to convert the optimized voltage into a second output voltage according to the second output voltage value.

The power supply device first detects the output voltage value and output power value of the first output port and the second output port, determines the reference voltage value according to the first output voltage value and the second output voltage value, and further adjusts the reference voltage value to determine an optimized voltage value, which is done according to the total output power value and the rated output current value of the AC/DC converting module 10. The AC/DC converting module 10 converts the input AC input voltage according to the optimized voltage value and outputs the optimized voltage Vbus. The first DC/DC converting module 21 and the second DC/DC converting module 22 convert the inputted optimized voltage into the first output voltage Vout1 and the second output voltage Vout2.

With reference to FIG. 1 and FIG. 2, the power supply device includes a PD control module 30, which is electrically connected to the first output port O/P1, the second output port O/P2, the AC/DC converting module 10, the first DC/DC converting module 21, and the second DC/DC converting module 22. The PD control module 30 performs the control method above to control the AC/DC converting module 10 to convert the AC input voltage into the optimized voltage Vbus, and controls the first DC/DC converting module 21 and the second DC/DC converting module 22 to convert the optimized voltage Vbus into the first output voltage Vout1 and the second output voltage Vout2. The first output voltage Vout1 and the second output voltage Vout2 are then respectively supplied to the first electronic device 91 and the second electronic device 92.

Figure 3:
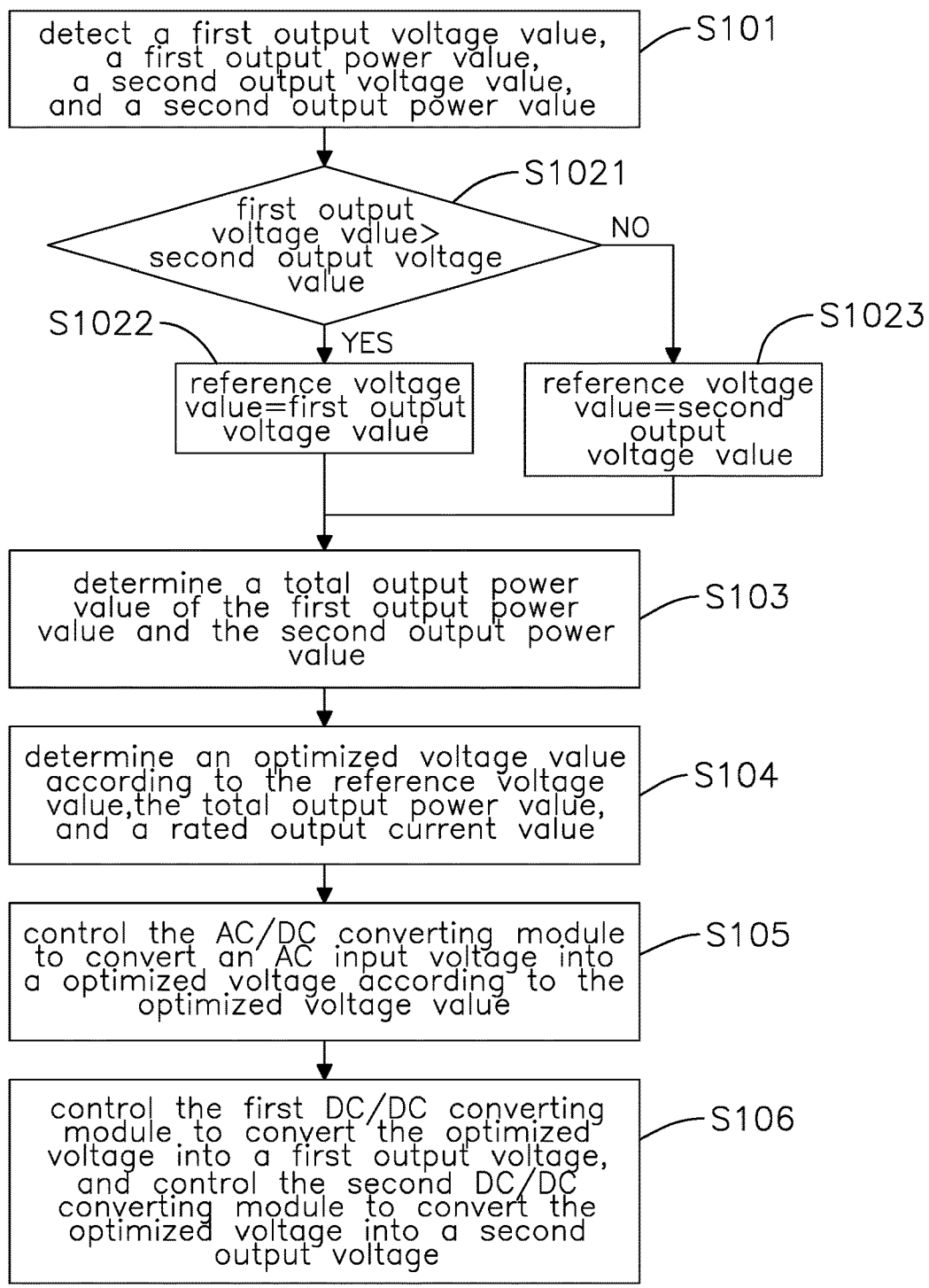
FIG. 3 is a flowchart of a first embodiment of a control method of a power supply device with multiple wide-voltage-range outputs of the present invention.

With reference to FIG. 3, in a first embodiment of the invention, the step of comparing the first output voltage value and the second output voltage value, and determining a reference voltage value according to the comparison result (S102) is carried out with the following sub-steps:

S1021: determining if the first output voltage value is larger than the second output voltage value;

S1022: if the first output voltage value is larger than the second output voltage value, determining the first output voltage value to be the reference voltage value; and S1023: if the first output voltage value is not larger than the second output voltage value, determining the second output voltage value to be the reference voltage value.

That is, in the step of determining the reference voltage value, the power supply device determines that the higher of the first output voltage value and the second output voltage value is the reference voltage value.

Figure 4:
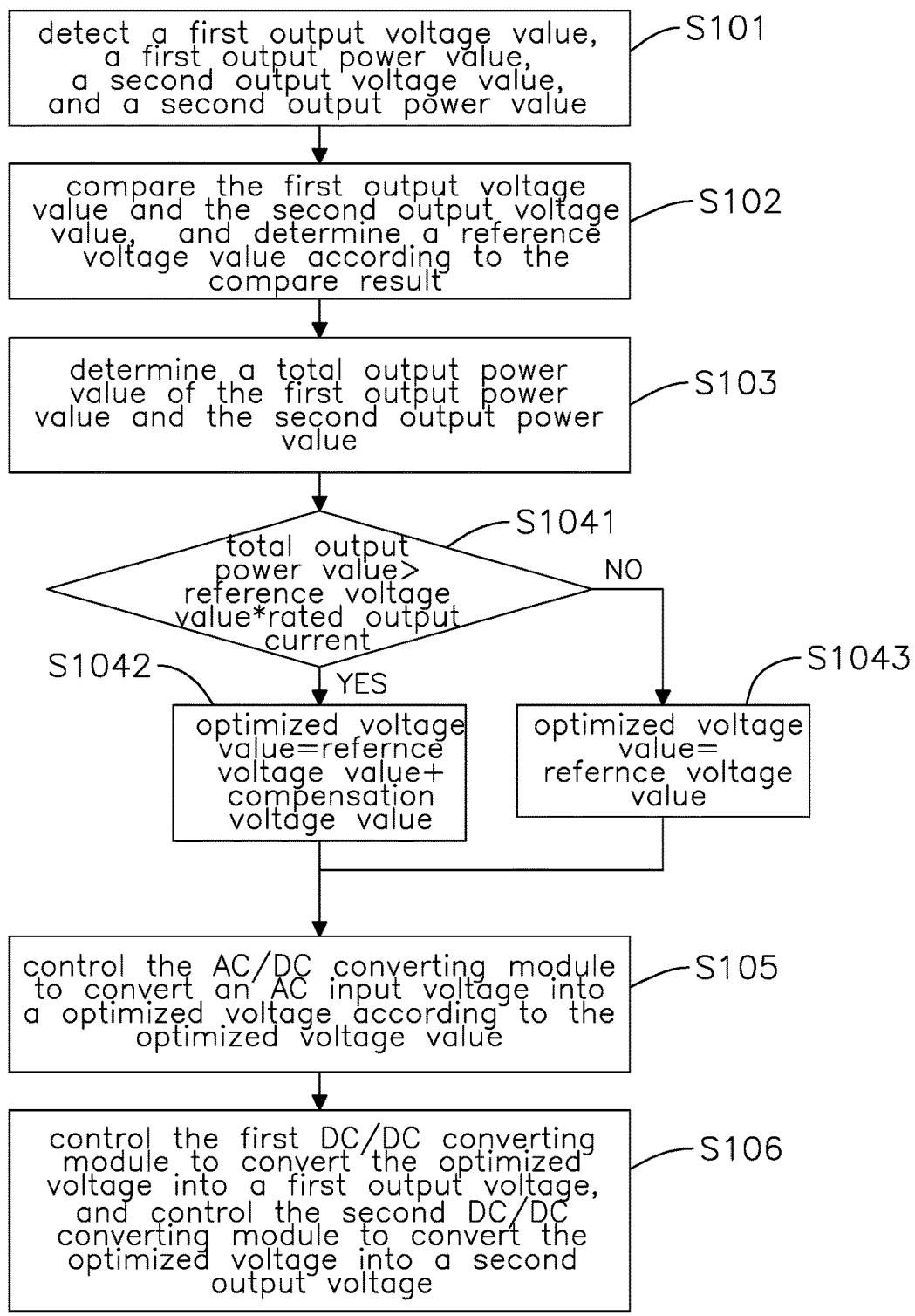
FIG. 4 is a flowchart of a second embodiment of a control method of a power supply device with multiple wide-voltage-range outputs of the present invention.

With reference to FIG. 4, in a second embodiment of the invention, the step of determining an optimized voltage value according to the reference voltage value, the total output power value, and a rated output current value of the AC/DC converting module (S104) is carried out with the following sub-steps:

S1041: determining if the total output power value is larger than the product of the reference voltage value and the rated output current value;

S1042: if the total output power value is larger than the product, determining a sum of the reference voltage value and a compensation voltage value to be the optimized voltage value; and S1043: if the total output power value is not larger than the product, determining the reference voltage value to be the optimized voltage value.

That is, after determining the reference voltage value, the total output power value of the power supply device to the first electronic device 91 and the second electronic device 92 needs to be further considered. According to the AC/DC converting module 10's rated output current value, the PD control module 30 determines whether the AC/DC converting module 10 outputting the referenced voltage with the rated output current is sufficient to support the total output power of the first and second electronic devices 91, 92. If the total power outputted with the referenced voltage and the rated output current is not enough, the PD control module 30 adjusts the reference voltage value as the optimized voltage value.

The following are some examples. In the first example, it is assumed that according to the specifications, the rated output current of the AC/DC converting module 10 is 3 A. The first output voltage value is 5V, the first output power value is 10 W, the second output voltage value is 9V, the second output power value is 27 W, and therefore the total output power value is 37 W. Based on the information above, according to step S102, the first output voltage value and the second output voltage value are compared, and the reference voltage value is 9V of the second output voltage value. Since the AC/DC converting module 10 has a rated output current value of 3 A, if the AC/DC converting module 10 converts the AC input voltage to a 9V output voltage, the maximum output power of the AC/DC converting module 10 is only 27 W, which is not enough to provide the total output power required by the first and second electronic devices 91, 92, and the AC/DC converting module 10 may be overcurrent. That is, in this example, the total output power value is greater than the product of the reference voltage value and the rated output current value (9V*3 A=27 W), so it is determined that the optimized voltage value is the sum of the reference voltage value and a compensation voltage value. The compensation voltage value is determined according to the total output power value, for example, so that the product of the optimized voltage value and the rated output current value is greater than the total output power value. As a result, the highest output power of the AC/DC converting module when outputting the optimized voltage is guaranteed to be sufficient to for supply to the first and second electronic devices 91, 92.

In this example, according to the total output power value 37 W and the rated output current value 3 A, the compensation voltage value may be determined to be 4V, that is, the optimized voltage value is 9V+4V=13V. In this way, the first DC/DC converting module 21 only needs to perform a step-down conversion of 13V to 5V, and the second DC/DC converting module 22 only needs to perform a step-down conversion of 13V to 9V. Compared with the prior art, the first and second DC/DC converting modules must perform step-down conversions of 22V to 5V and 22V to 9V, respectively, resulting in lower conversion efficiency. It is clearly proved that the power supply and control method of the invention greatly reduce the voltage reduction range and the conversion loss therein, and ensure sufficient output power.

In another case, if the total output power value is less than the product of the reference voltage value and the rated output current value, it means that when the AC/DC converting module 10 outputs the referenced voltage, the output power outputted by the AC/DC converting module is sufficient to provide the total output power. The reference voltage value does not need to be compensated and is directly set to be the optimized voltage value.

For example, the first output voltage value is 5V, the first output power value is 5 W, the second output voltage value is 9V, and the second output power value is 18 W, and therefore the total output power value is 23 W. Based on the above information, according to step S102, the first output voltage value and the second output voltage value are compared, and the reference voltage value is 9V of the second output voltage value. Since the rated output current value of the AC/DC converting module 10 is 3 A, if the AC/DC converting module 10 converts the AC input voltage to a DC voltage of 9V, it means that the maximum output power of the AC/DC converting module 10 is 27 W, which is enough to supply the total output power (23 W) of the first output power value and the second output power value. It is decided that the optimized voltage value is 9V. In this way, the first DC/DC converting module 21 only needs to perform step-down conversion from 9V to 5V, and the second DC/DC converting module 22 does not need to perform a step-down conversion. The conversion loss is minimized.

Figure 5:
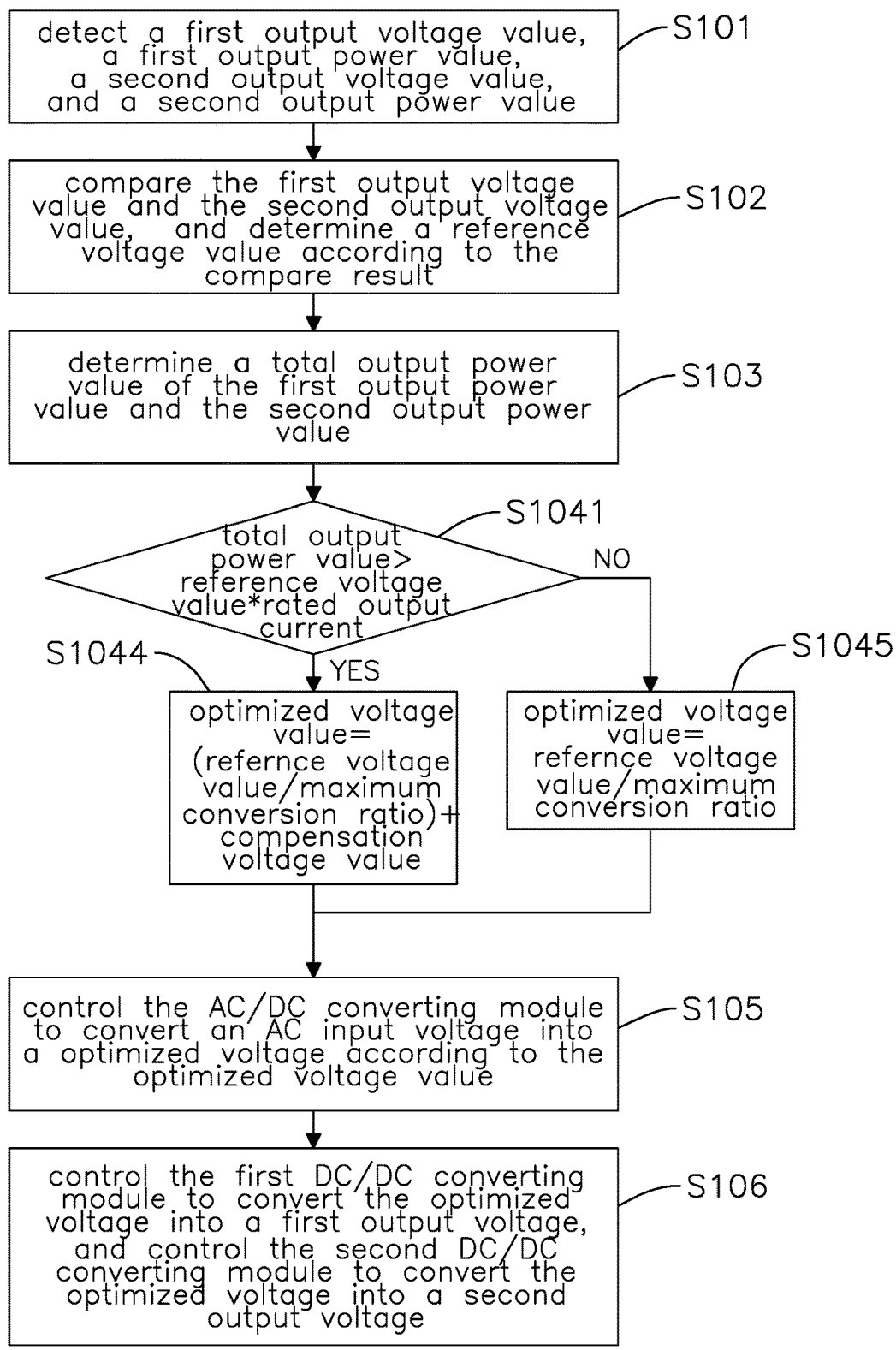
FIG. 5 is a flowchart of a third embodiment of a control method of a power supply device with multiple wide-voltage-range outputs of the present invention.

With reference to FIG. 5, in a third embodiment of the present invention, the first DC/DC converting module and the second DC/DC converting module have a maximum conversion rate. Therefore, the step of determining the optimized voltage value according to the reference voltage value, the total output power value, and a rated output current value of the AC/DC converting module (S104) is carries out with the following sub-steps:

S1041: determining if the total output power value is larger than a product of the reference voltage value and the rated output current value;

S1044: if the total output power value is larger than the product, determining a sum of a quotient of the reference voltage value divided by the maximum conversion rate and a compensation voltage value to be the optimized voltage value; and S1045: if the total output power value is not larger than the product, determining a quotient of the reference voltage value divided by the maximum conversion rate to be the optimized voltage value.

In the preferred embodiment, since the reference voltage value is determined according to the higher of the first output voltage value and the second output voltage value, the optimized voltage value is bound to be higher than or equal to the first output voltage value and the second output voltage value, therefore the first DC/DC converting module 21 and the second DC/DC converting module 22 are preferably Buck converters. Furthermore, according to the highest duty cycle of the first DC/DC converting module 21 and the second DC/DC converting module 22, the first and second DC/DC converting modules 21, 22 each have a maximum conversion rate. For example, when the maximum conversion ratio is 95%, it means that when an input voltage of the DC converter is 20V, the maximum output voltage of the conversion module is 19V. Therefore, when the power supply device determines the reference voltage value and further considers the total output power value to determine the optimized voltage value, it divides the reference voltage value by the maximum conversion rate, and then performs the voltage compensation with the revised reference voltage value.

Figure 6:
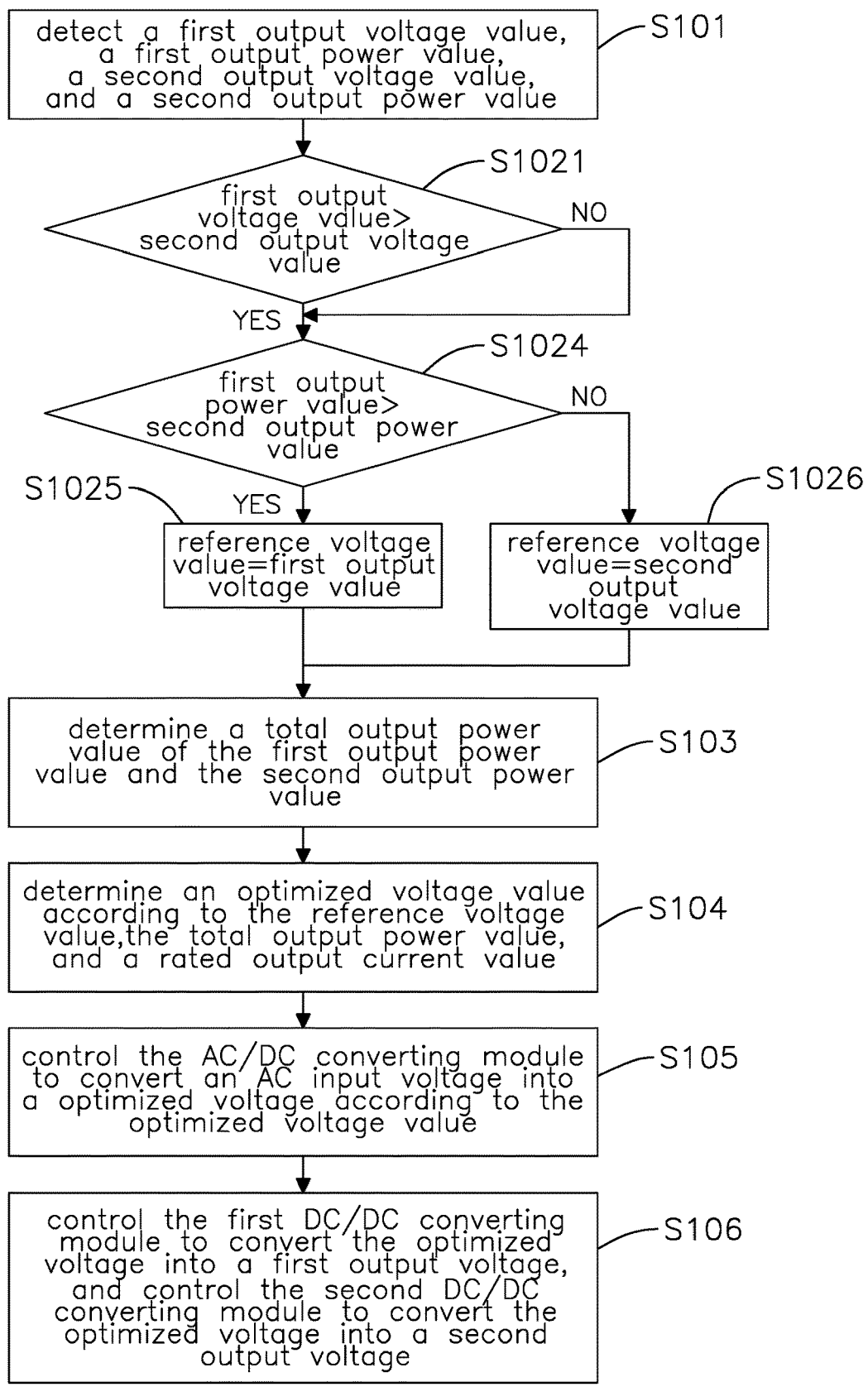
FIG. 6 is a flowchart of a fourth embodiment of a control method of a power supply device with multiple wide-voltage-range outputs of the present invention.

With reference to FIG. 6, in a fourth embodiment of the invention, the step of "comparing the first output voltage value and the second output voltage value, and determining a reference voltage value according to the comparison result" (S102) is carried out with the following sub-steps:

S1021: determining if the first output voltage value is larger than the second output voltage value;

S1024: determining if the first output power value is larger than the second output power value;

S1025: if the first output power value is larger than the second output power value, determining the first output voltage value to be the reference voltage value; and S1026: if the first output power value is not larger than the second output power value, determining the second output voltage value to be the reference voltage value. In the present embodiment, the first output power value and the second output power value are considered the main judgment criteria. That is, the output voltage value of the electronic device requiring a higher output power value is used as the reference voltage value. The reference voltage value is determined according to the output voltage value of the electronic device with a higher output power value. The first DC/DC converting module 21 or the second DC/DC converting module 22 that outputs a higher power can reduce the conversion loss as much as possible, thereby reducing the overall conversion loss of the power supply device.

When the output power value required by one of the electronic devices is higher but a smaller output voltage value is required, the reference voltage value may be smaller than the first output voltage value or the second output voltage value. That is, the reference voltage value is the smaller of the first output voltage value or the second output voltage value. In this case, the first DC/DC converting module 21 or the second DC/DC converting module 22 must perform a voltage boosting conversion. Therefore, the first DC/DC converting module 21 or the second DC/DC converting module 22 is preferably a Buck-Boost Converter.

The preferred embodiments of the power supply device with multiple sets of wide-range voltage outputs are described below.

Figure 7:
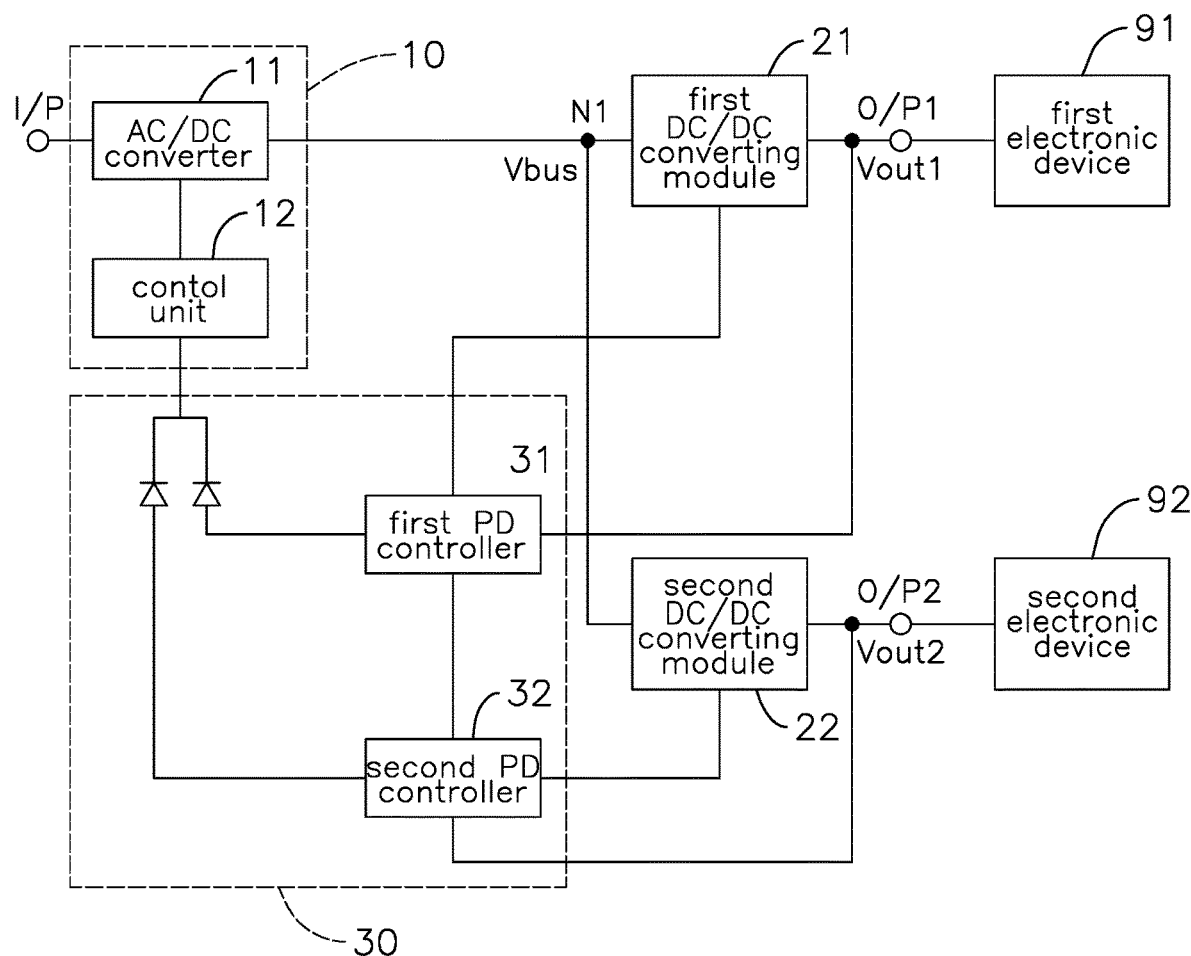
FIG. 7 is a block diagram of a fifth embodiment of the power supply device with multiple wide-voltage-range outputs of the present invention.

With reference to FIG. 7, in a sixth embodiment of the invention, the PD control module 30 of the power supply device includes a first power delivery (PD) controller 31 and a second power delivery (PD) controller 32. The first PD controller 31 is connected to the first output port O/P1 and detects the first output voltage value and the first output power value. The second PD controller 32 is connected to the second output port O/P2 and detects the second output voltage value and the second output power value. Further, the first PD controller 31 and the second PD controller 32 are electrically connected to each other; the first PD controller 31 transmits the first output voltage value and the first output power value to the second PD controller 32, and the second power controller 32 transmits the second output voltage value and the second output power value to the first PD controller 31. The first PD controller 31 and the second PD controller 32 both compare the first output voltage value and the second output voltage value. When the first output voltage value is greater than the second output voltage value, the first PD controller 31 and the second PD controller 32 both determine that the first output voltage value is the reference voltage value, and correspondingly, the optimized voltage value is determined by the first PD controller 31. When the second output voltage value is greater than the first output voltage value, the first PD controller 31 and the second PD controller 32 determine that the second output voltage value is the reference voltage value, and the optimized voltage value is determined by the second PD controller 32.

That is, when the first PD controller 31 and the second PD controller 32 detect the output voltage value and the output power value of the first electronic device 91 and the second electronic device 92, the first PD controller 31 and second PD controller 32 exchange the output voltage value and output the power value of the first or second electronic device 91, 92 detected by themselves, and both perform the comparison of the first output voltage value and the second output voltage value. Since both the first PD controller 31 and the second PD controller 32 obtain the same comparison result according to the higher of the first output voltage value and the second output voltage value and determine the same reference voltage value, the optimized voltage value is then determined by the PD controller corresponding to the reference voltage value. That is, when the first output voltage value is higher and therefore the first output voltage value is determined to be the reference voltage value, the first PD controller 31 calculates the total output power value based on the first output power value and the second output power value, and performs the steps to determine the optimized voltage value. At last, the first PD controller 31 transmits the optimized voltage value to the AC/DC converting module 10. When the second output voltage value is higher, the second PD controller 32 performs subsequent steps to determine the optimized voltage value, and sends the optimized voltage value to the AC/DC converting module 10.

In addition, the AC/DC converting module 10 includes an AC/DC converter 11 and a control unit 12. The AC/DC converter 11 has the converted voltage output end, and is electrically connected to the AC input port to receive the AC input voltage. The control unit 12 is electrically connected the AC/DC converter 11, and is connected to the first PD controller 31 and the second PD controller 32 of the PD control module 30. The control unit 12 controls the AC/DC converter 11 to convert the AC input voltage into the optimized voltage Vbus according to the optimized voltage value generated by the first PD controller 31 or the second PD controller 32.

Figure 8:
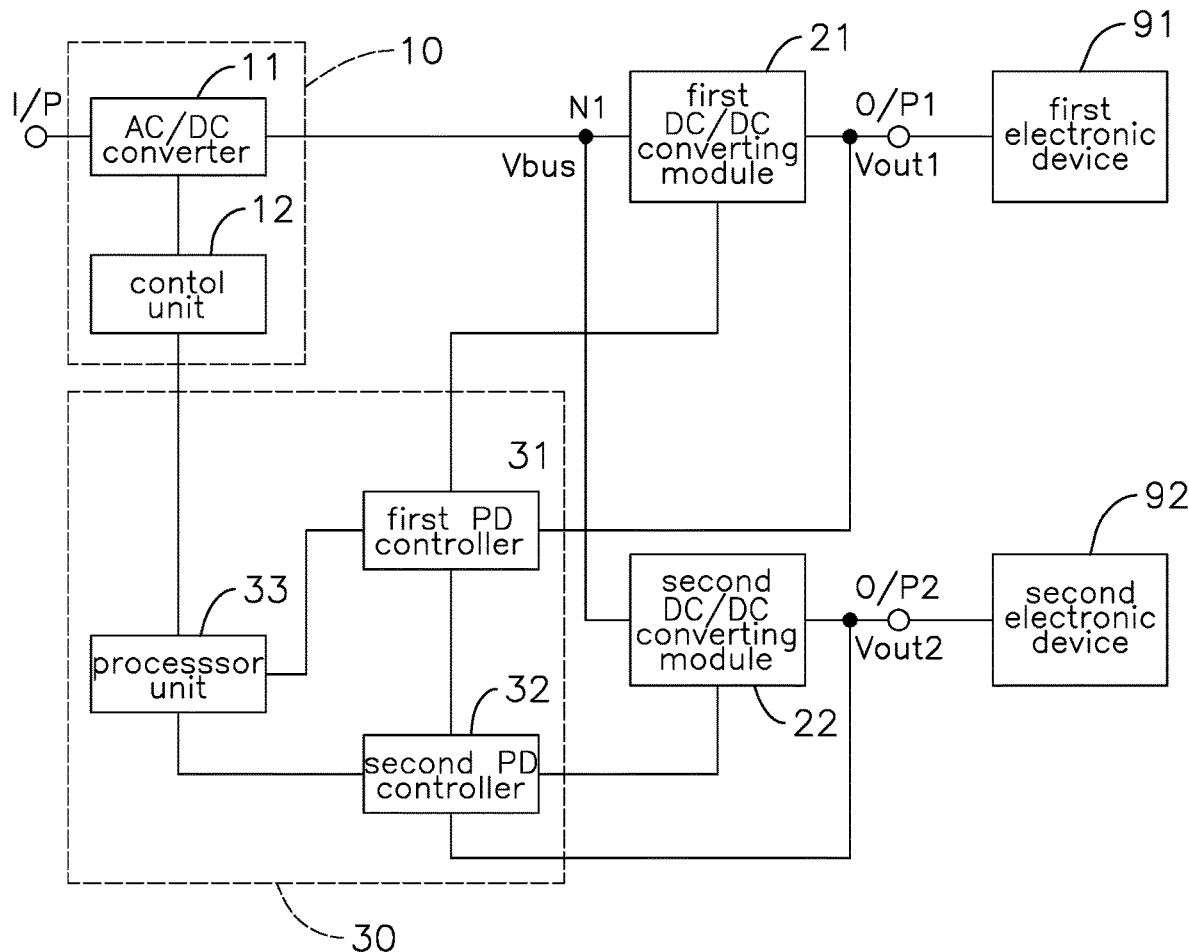
FIG. 8 is a block diagram of a sixth embodiment of the power supply device with multiple wide-voltage-range outputs of the present invention.

With reference to FIG. 8, in a sixth embodiment of the invention, the PD control module 30 includes a first PD controller 31, a second PD controller 32 and a processor unit 33. The first PD controller 31 is connected to the first output port O/P1 and detects the first output voltage value and the first output power value. The second PD controller 32 is connected to the second output port O/P2 and detects the second output voltage value and the second output power value. The processor unit 33 is electrically connected to the first PD controller 31 and the second PD controller 32. The first PD controller 31 detects the first output voltage value and the first output power value, and the second PD controller 32 detects the second output voltage value and the second output power value, and the processor unit 33 compares the first output voltage value and the second output voltage value to determine the reference voltage value and calculates the total output power value from the first output power value and the second output power value, and then determines the optimized voltage value based on the reference voltage value, the rated output current value of the AC/DC converting module 10, and the total output power value. The rated output current value is stored in the control unit 12.

That is, in the preferred embodiment, the processor unit 33 in the PD control module 30 receives the first output voltage value, the second output voltage value, the first output power value, and the second output power value from the first and second PD controllers 31, 32, and performs the comparison of the first output voltage value and the second output voltage value to determine the reference voltage value, and determines the optimized voltage value according to the reference voltage value, the rated output current value of the AC/DC converting module 10 and the total output power value. The processor unit 33 transmits the control signal including the optimized voltage value to the control unit 12 of the AC/DC converting module 10.

The control unit 12 of the AC/DC converting module 10 is connected to the processor unit 33 of the PD control module 30 to receive the optimized voltage value from the processor unit 33, and controls the AC/DC converter 11 to convert the AC input voltage into the optimized voltage Vbus.

What is claimed is:

1. A control method for a power supply device with multiple wide-voltage-range outputs, wherein the power supply device has a first output port, a second output port, and includes an AC/DC converting module, a first DC/DC converting module, a second DC/DC converting module, and a power delivery control module; the control method is performed by the power delivery control module; the control method comprises the following steps:
   detecting a first output voltage value and a first output power value of the first output port, and detecting a second output voltage value and a second output power value of the second output port;
   comparing the first output voltage value and the second output voltage value, and determining a reference voltage value according to the comparison result;
   determining a total output power value according to the first output power value and the second output power value;
   determining an optimized voltage value according to the reference voltage value, the total output power value, and a rated output current value of the AC/DC converting module;
   controlling the AC/DC converting module to convert an AC input voltage into an optimized voltage according to the optimized voltage value; and
   controlling the first DC/DC converting module to convert the optimized voltage into a first output voltage according to the first output voltage value, and controlling the second DC/DC converting module to convert the optimized voltage into a second output voltage according to the second output voltage value.

2. The control method for the power supply device with multiple wide-voltage-range outputs as claimed in claim 1, wherein the step of comparing the first output voltage value and the second output voltage value, and determining a reference voltage value according to the comparison result further comprises the following sub-steps:
determining if the first output voltage value is larger than the second output voltage value;
if the first output voltage value is larger than the second output voltage value, determining the first output voltage value to be the reference voltage value; and
if the first output voltage value is not larger than the second output voltage value, determining the second output voltage value to be the reference voltage value.

3. The control method for the power supply device with multiple wide-voltage-range outputs as claimed in claim 2, wherein the step of determining an optimized voltage value according to the reference voltage value, the total output power value, and a rated output current value of the AC/DC converting module further comprises the following sub-steps:
determining if the total output power value is larger than a product of the reference voltage value and the rated output current value;
if the total output power value is larger than the product, determining a sum of the reference voltage value and a compensation voltage value to be the optimized voltage value; and
if the total output power value is not larger than the product, determining the reference voltage value to be the optimized voltage value.

4. The control method for the power supply device with multiple wide-voltage-range outputs as claimed in claim 2, wherein the first DC/DC converting module and the second DC/DC converting module have a maximum conversion rate, and the step of determining an optimized voltage value according to the reference voltage value, the total output power value, and a rated output current value of the AC/DC converting module further comprises the following sub-steps:
determining if the total output power value is larger than a product of the reference voltage value and the rated output current value;
if the total output power value is larger than the product, determining a sum of a quotient of the reference voltage value divided by the maximum conversion rate and a compensation voltage value to be the optimized voltage value; and
if the total output power value is not larger than the product, determining a quotient of the reference voltage value divided by the maximum conversion rate to be the optimized voltage value.

5. The control method for the power supply device with multiple wide-voltage-range outputs as claimed in claim 1, wherein the step of comparing the first output voltage value and the second output voltage value, and determining a reference voltage value according to the comparison result further comprises the following sub-steps:
determining if the first output voltage value is larger than the second output voltage value;
determining if the first output power value is larger than the second output power value;
if the first output power value is larger than the second output power value, determining the first output voltage value to be the reference voltage value; and
if the first output power value is not larger than the second output power value, determining the second output voltage value to be the reference voltage value.

6. A power supply device with multiple wide-voltage-range outputs, connecting to an AC power source, a first electronic device, and a second electronic device; the power supply device comprising:
an AC input port, connected to the AC power source to receive an AC input voltage;
a first output port, connected to the first electronic device;
a second output port, connected to the second electronic device;
a power delivery control module, connected to the first output port and the second output port; the power delivery control module detecting a first output voltage value and a first output power value of the first output port, and detecting a second output voltage value and a second output power value of the second output port;
an AC/DC converting module, connected to the AC input port and the power delivery control module, and having a converted voltage output end, wherein
the power delivery control module compares the first output voltage value and the second output voltage value, and determines a reference voltage value according to the comparison result, and the power delivery control module determines a total output power value according to the first output power value and the second output power value, and determines an optimized voltage value according to the reference voltage value, the total output power value, and a rated output current value of the AC/DC converting module; and
the AC/DC converting module converts the AC input voltage into an optimized voltage according to a control signal of the power delivery control module, and outputs the optimized voltage to the converted voltage output end;
a first DC/DC converting module, connected between the converted voltage output end and the first output port, the first DC/DC converting module receiving the optimized voltage and converting the optimized voltage into a first output voltage, and outputting the first output voltage to the first output port; and
a second DC/DC converting module, connected between the converted voltage output end and the second output port, the second DC/DC converting module receiving the optimized voltage and converting the optimized voltage into a second output voltage, and outputting the second output voltage to the second output port.

7. The power supply device with multiple wide-voltage-range outputs as claimed in claim 6, wherein the power delivery control module comprises:
a first power delivery controller, connected to the first output port to detect the first output voltage value and the first output power value; and
a second power delivery controller, connected to the second output port, and detecting the second output voltage value and the second output power value; wherein
when the first power delivery controller and the second power delivery controller are connected, the first power delivery controller transmits the first output voltage value and the first output power value to the second power delivery controller, and the second power delivery controller transmits the second output voltage value and the second output power value to the first power delivery controller;

when the first output voltage value is greater than the second output voltage value, the first power delivery controller and the second power delivery controller determine that the first output voltage value is the reference voltage value; the first power delivery controller calculates the total output power value of the first output power value and the second output power value, and determines the optimized voltage value according to the reference voltage value, the total output power value, and the rated output current value of the AC/DC converting module; and when the second output voltage value is greater than the first output voltage value, the first power delivery controller and the second power delivery controller determine that the second output voltage value is the reference voltage value; the second power delivery controller calculates the total output power value of the first output power value and the second output power value, and determines the optimized voltage value according to the reference voltage value, the total output power value, and the rated output current value of the AC/DC converting module.

8. The power supply device with multiple wide-voltage-range outputs as claimed in claim 7, wherein the AC/DC converting module comprises:
   an AC/DC converter, having the converted voltage output end and connected to the AC input port; and
   a control unit, connected to the AC/DC converter, the first power delivery controller, and the second power delivery controller; the control unit receiving the optimized voltage value from the first power delivery controller or the second power delivery controller, and controlling the AC/DC converter to convert the AC input voltage into the optimized voltage according to the optimized voltage value.

9. The power supply device with multiple wide-voltage-range outputs as claimed in claim 6, wherein the power delivery control module comprises:
   a first power delivery (PD) controller, connected to the first output port and detecting the first output voltage value and the first output power value of the first electronic device;
   a second PD controller, connected to the second output port and detecting the second output voltage value and the second output power value of the first electronic device; and
   a processor unit, connected to the first PD controller and the second PD controller, receiving the first output voltage value and the first output power value from the first PD controller, and receiving the second output voltage value and the second output power value from the second PD controller; the processor unit comparing the first output voltage value and the second output voltage value, and determining the reference voltage value according to the comparison result, determining the total output power value according to the first output power value and the second output power value, and determining the optimized voltage value.

10. The power supply device with multiple wide-voltage-range outputs as claimed in claim 9, wherein the AC/DC converting module comprises:
   an AC/DC converter, having the converted voltage output end and connected to the AC input port; and
   a control unit, connected to the AC/DC converter and the processor unit; the control unit receiving the optimized voltage value from the processor unit, and controlling the AC/DC converter to convert the AC input voltage into the optimized voltage according to the optimized voltage value.

* * * * *